(12) United States Patent
Roberge

(10) Patent No.: US 11,140,827 B2
(45) Date of Patent: Oct. 12, 2021

(54) ROUND BALE ALIGNER AND ACCUMULATOR

(71) Applicant: CNH Industrial Canada, Ltd., Saskatoon (CA)

(72) Inventor: Martin J. Roberge, Saskatoon (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 0 days.

(21) Appl. No.: 16/745,534

(22) Filed: Jan. 17, 2020

(65) Prior Publication Data
US 2021/0219496 A1 Jul. 22, 2021

(51) Int. Cl.
A01D 90/10 (2006.01)
A01F 15/08 (2006.01)

(52) U.S. Cl.
CPC .......... A01D 90/10 (2013.01); A01F 15/0883 (2013.01)

(58) Field of Classification Search
CPC ...... A01D 90/10; A01D 43/086; A01D 90/08; A01F 15/0883
USPC ........................................ 414/24.5, 24.6, 111
See application file for complete search history.

(56) References Cited

U.S. PATENT DOCUMENTS

| 2,453,384 A | 11/1948 | Renken |
| 4,376,607 A * | 3/1983 | Gibson ................ A01D 90/083 241/101.76 |
| 4,844,675 A * | 7/1989 | Strasser ............... A01D 85/005 414/111 |
| 5,320,477 A * | 6/1994 | Druse, Sr. ............ A01D 90/083 414/24.5 |
| 5,560,191 A | 10/1996 | Finney et al. |
| 5,664,923 A | 9/1997 | Olin |
| 5,697,758 A * | 12/1997 | Tilley ..................... A01D 90/08 414/111 |
| 6,019,562 A | 2/2000 | Cheatham |
| 6,106,209 A * | 8/2000 | Krenek ..................... B60P 7/12 414/24.5 |
| 6,152,536 A | 11/2000 | Krinhop |
| 6,840,729 B2 | 1/2005 | Haukaas |
| 7,353,753 B2 | 4/2008 | Viaud |
| 7,530,215 B2 | 5/2009 | Guiet et al. |
| 8,230,663 B2 | 7/2012 | Viaud |
| 8,261,512 B2 | 9/2012 | Gette et al. |
| 8,567,169 B2 * | 10/2013 | Spaniol ............... A01D 85/005 56/474 |
| 10,070,589 B1 | 9/2018 | Kuhns |
| 2012/0090481 A1 | 4/2012 | Pieper et al. |

(Continued)

FOREIGN PATENT DOCUMENTS

| EP | 0 350 537 A1 | 1/1990 |
| EP | 1 604 565 A1 | 12/2005 |
| EP | 1 832 156 A1 | 9/2007 |

(Continued)

Primary Examiner — Lynn E Schwenning
(74) Attorney, Agent, or Firm — Peter Zacharias; Patrick Sheldrake

(57) ABSTRACT

A bale accumulator for a round baler including a frame configured for being located behind the bale chamber of the round baler and a plurality of bale holders configured for receiving and temporarily holding the bales. Each bale holder is pivotally and rotatably connected to the frame such that each bale holder is configured for rolling the bales by pivoting relative to the frame and realigning the bales by rotating relative to the frame.

20 Claims, 9 Drawing Sheets

(56) References Cited

U.S. PATENT DOCUMENTS

2016/0050851 A1    2/2016  Kraus
2018/0020621 A1*   1/2018  Jones .................. A01F 15/0883
                                                          56/341

FOREIGN PATENT DOCUMENTS

| EP | 1 832 157 A1 | 9/2007 |
| EP | 2 090 153 A1 | 8/2009 |
| EP | 2 149 293 A1 | 2/2010 |
| EP | 2 384 617 A1 | 11/2011 |
| EP | 2 974 589 A1 | 1/2016 |
| EP | 2 974 590 A1 | 1/2016 |
| EP | 2 974 591 A1 | 1/2016 |
| EP | 2 974 592 A1 | 1/2016 |
| EP | 2 974 593 A1 | 1/2016 |
| EP | 2 974 594 A1 | 1/2016 |
| EP | 3 150 061 A1 | 4/2017 |
| EP | 3 162 189 A2 | 5/2017 |
| EP | 3 228 181 A1 | 10/2017 |
| EP | 3 231 273 A1 | 10/2017 |
| EP | 3 231 274 A1 | 10/2017 |
| EP | 3 235 368 A1 | 10/2017 |
| EP | 3 298 882 A1 | 3/2018 |
| EP | 3 351 086 A1 | 7/2018 |
| FR | 2 751 506 A1 | 1/1998 |
| JP | 2005-58090 A | 3/2005 |
| WO | 2017/163229 A1 | 9/2017 |
| WO | 2017/205712 A1 | 11/2017 |
| WO | 2018/158630 A1 | 9/2018 |

* cited by examiner

ROUND BALE ALIGNER AND ACCUMULATOR

BACKGROUND OF THE INVENTION

The present invention pertains to agricultural balers and, more specifically, to a bale accumulator for an agricultural round baler.

Agricultural harvesting machines, such as balers, are used to consolidate and package crop material so as to facilitate the storage and handling of the crop material for later use. In the case of hay or silage, a mower-conditioner is typically used to cut and condition the crop material. In the case of straw, an agricultural combine discharges non-grain crop material from the rear of the combine defining the straw which is to be picked up by the baler. The cut crop material is typically raked into a windrow, and a baler, such as a large square baler or round baler, straddles the windrows and travels along the windrows to pick up the crop material and form it into bales.

A round baler may generally include a frame, supported by wheels, a pickup unit to engage and lift the crop material into the baler, a cutting unit, a main bale chamber for forming a bale, and a wrapping mechanism for wrapping or tying a material around the bale after it has been formed in the main bale chamber. As the baler is towed over a windrow, the pickup unit lifts the crop material into the baler. Then, the crop material may be cut into smaller pieces by the cutting unit. As the crop material enters the main bale chamber, multiple carrier elements, e.g. rollers, chains and slats, and/or belts, will begin to roll a bale of hay within the chamber. These carrier elements are movable so that the chamber can initially contract and subsequently expand to maintain an appropriate amount of pressure on the periphery of the bale. After the bale is formed and wrapped by the wrapping mechanism, the rear of the baler is configured to open for allowing the bale to be discharged onto the field.

Generally, an agricultural baler deposits bales throughout a field in an arbitrary fashion as bales are simply ejected from the baler upon being completely formed and wrapped. Subsequently, an individual must then collect the individually dispersed bales and move the bales to a transport trailer and/or storage location. Hence, this process of collecting individual bales may be inefficient and toilsome. Furthermore, the additional in-field operating time may lead to aggravated soil compaction and excessive wear on transport machinery.

To help make the process of collecting bales more efficient, an agricultural baler may further include a bale accumulator, which receives and temporarily stores multiple bales and subsequently deposits these grouped bales onto the field. Grouping two or more bales within the field helps to streamline the process of collecting the bales as the operator may collect and transport the group of bales instead of time-consumingly collecting the bales one-by-one. A bale accumulator may be fixedly or removably attached to the rear of the baler. A typical accumulator includes a frame, a receiving and holding area, a conveying device such as a belt or arm to move the bale within the frame, and actuators for operating the conveying device and/or pivoting the accumulator relative to the baler to deposit the grouped bales. However, known accumulators may be complex and unreliable machines which require regular maintenance. Additionally, such accumulators may not be capable of realigning or reorienting the bales such that the bales are deposited onto the field in the same axial alignment as they were in the bale chamber. Thus, the grouped bales may be prone to undesirably moving in the field; for example, the bales may be aligned in a default position which causes the bales to roll down a hill in the field upon being deposited.

What is needed in the art is an accumulator for a round baler which automatically places multiple round bales on the field in a desired alignment.

SUMMARY OF THE INVENTION

In one exemplary embodiment formed in accordance with the present invention, there is provided a bale multipurpose bale accumulator for dually realigning and unloading bales in a desired in-field orientation and grouped configuration. The bale accumulator includes a frame and multiple, individual bale holders which are pivotally and rotatably connected to the frame. The bale holders may be rotated individually or in tandem. The bale accumulator may also include a controller for automatically aligning and unloading the bales in response to one or more sensed and/or stored parameters.

In another exemplary embodiment formed in accordance with the present invention, there is provided a bale accumulator for a round baler including a bale chamber for forming bales of crop material. The bale accumulator includes a frame configured for being located behind the bale chamber and a plurality of bale holders configured for receiving and temporarily holding the bales. Each bale holder is pivotally and rotatably connected to the frame such that each bale holder is configured for rolling the bales by pivoting relative to the frame and realigning the bales by rotating relative to the frame.

In another exemplary embodiment formed in accordance with the present invention, there is provided a round baler that includes a bale chamber for forming bales of crop material and a bale accumulator. The bale accumulator includes a frame located behind the bale chamber and a plurality of bale holders configured for receiving and temporarily holding the bales. Each bale holder is pivotally and rotatably connected to the frame such that each bale holder is configured for rolling the bales by pivoting relative to the frame and realigning the bales by rotating relative to the frame.

In another exemplary embodiment formed in accordance with the present invention, there is provided a method for operating a round baler. The method includes an initial step of providing a bale accumulator for the round baler. The bale accumulator includes a frame configured for being located behind a bale chamber of the round baler and a plurality of bale holders configured for receiving and temporarily holding bales. Each bale holder is pivotally and rotatably connected to the frame. The method includes the further steps of receiving the bales by the plurality of bale holders, temporarily holding the bales by the plurality of bale holders, and realigning the bales by rotating the plurality of the bale holders relative to the frame. The method may further include unloading the bales onto a field by pivoting the plurality of bale holders.

One possible advantage of the exemplary embodiment of the agricultural baler is that the bales may be automatically realigned into a desired in-field orientation by rotating the bales while they are still within the bale accumulator.

Another possible advantage of the exemplary embodiment of the agricultural vehicle is that the bales may be rolled from one bale holder to another bale holder such that the bale holder may temporarily hold up to three bales without damaging the bales.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with the agricultural baler and/or components thereof are usually determined with reference to the direction of forward operative travel of the towing vehicle, but they should not be construed as limiting. The terms "longitudinal" and "transverse" are determined with reference to the fore-and-aft direction of the towing vehicle and are equally not to be construed as limiting.

Figure 1:
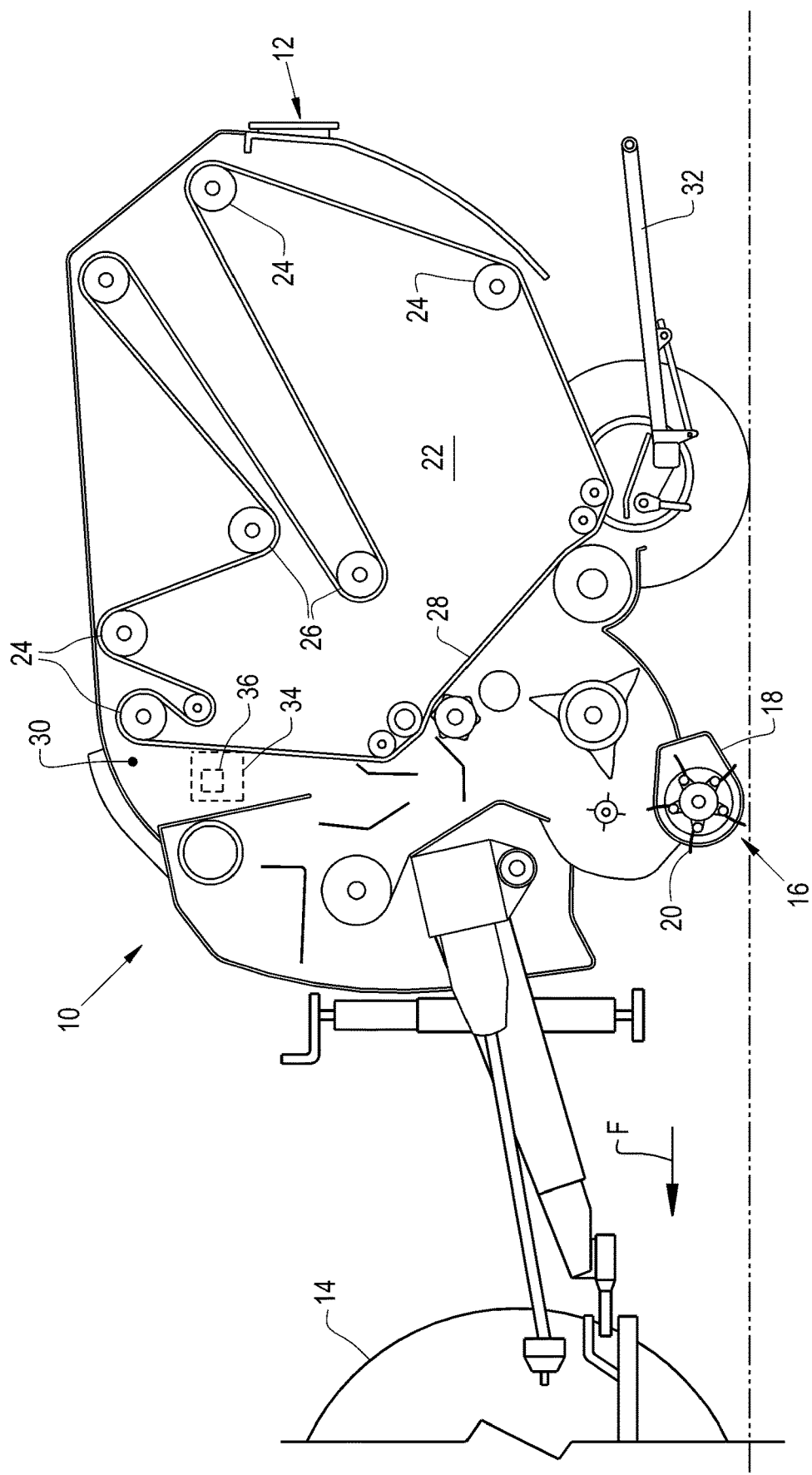
FIG. 1 illustrates a perspective view of a known agricultural baler.
Figure 2:
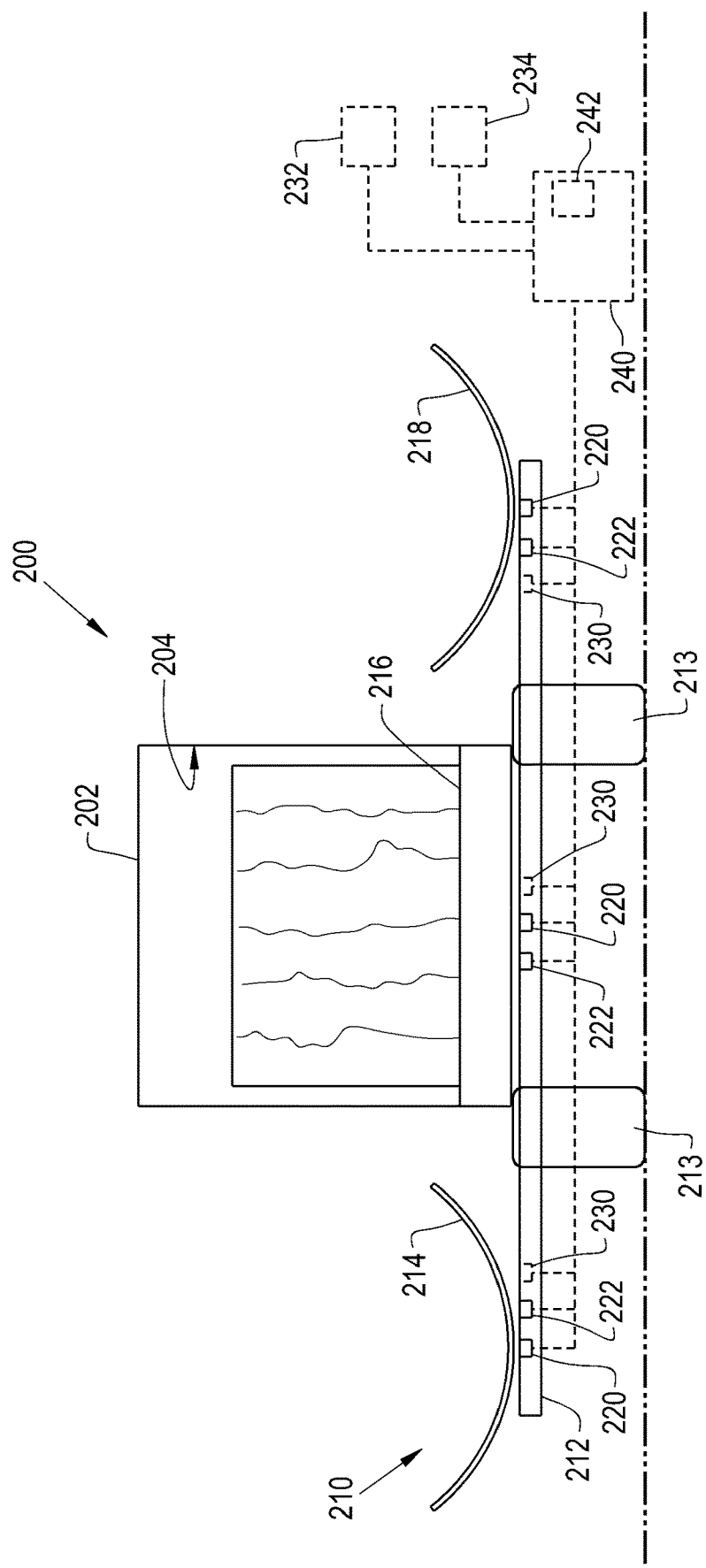
FIG. 2 illustrates a rear view of an exemplary embodiment of a bale accumulator that includes individual bale holders which are independently rotatable, wherein the middle bale holder is in a normal position for receiving a bale, in accordance with an exemplary embodiment of the present invention.

Referring now to the drawings, and more particularly to FIG. 1, there is shown a cross-sectional, side view of a known round baler 10 which may be towed by a vehicle 14 in a forward direction of travel F. The vehicle 14 may be any desired vehicle, such as an agricultural vehicle in the form of a tractor 14.

Crop material is lifted from windrows into the baler 10 by a pickup unit 16. The pickup unit 16 includes a rotating pickup reel 18 with tine bars and tines 20, which move the crop rearward toward a variable bale chamber 22. The reel 18 is rotatable in an operating direction for lifting the crop material off the ground and in a reverse direction, i.e., opposite to the operating direction.

The bale chamber 22 may be configured as a variable bale chamber 22 which includes multiple rolls or rollers 24, 26, such as various stationary rollers 24 and movable rollers 26, actuators and pivot arms coupled to the movable rollers 26, and at least one belt 28. The rollers 24, 26 may comprise a floor roller, starter roller, fixed roller(s), pivot roller(s), stripper roller, and/or follower roller(s). Together, the rollers 24, 26 and the belt(s) 28 create a round circulating chamber which expands in between an empty bale position and a full bale position for engaging and rolling the bale. As the bale grows inside the chamber 22 it begins to act upon the belts 28 such that the belts 28 pull against the pivot arms which in turn causes the movable rollers 26 to move upwardly so that the variable bale chamber 22 incrementally expands with the size of the bale. It should be appreciated that the bale chamber 22 may be in the form of a fixed bale chamber configuration with rollers and/or slats and chains.

When the bale reaches a predetermined size, the bale is wrapped with a wrapping material (e.g., mesh or twine) by a wrapper. Then, once fully wrapped, the bale is ejected out of the tail gate 12. The tail gate 12 may pivot upwardly about pivot axis 30 to open the bale chamber 22. Then, the bale rolls out of the bale chamber 22 and onto a bale ejector or kicker 32, which pushes the bale rearwardly away from the baler 10 so that the tail gate 12 may downwardly pivot unencumbered by the ejected bale.

The baler 10 can further include an electrical processing circuit 34, e.g. controller 34 with a memory 36, for conducting various baling procedures. For instance, the controller 34 can be configured for carrying out the bale discharge operation. Hence, the controller 34 may open the tail gate 12 via accompanying actuators upon sensing a full bale condition by a bale-size sensor (not shown).

Referring now to the drawings, and more particularly to FIGS. 2-7, there is shown an agricultural round baler 200 that generally includes a main frame 202, a bale chamber 204 for forming bales therein, and a multipurpose bale accumulator 210 for dually accumulating and aligning two or more bales. The agricultural round baler 200 may be in the form of any desired round baler, such as a continuous round baler. The agricultural round baler 200 may be similar to the conventional baler 10, as described above.

The bale accumulator 210 may generally include a frame 212, two or more bale holders, such as a left, middle, and right bale holder 214, 216, 218, a motor 220 operably connected to each bale holder 214, 216, 218, and one or more actuators 222 associated with each platform 214, 216, 218. The bale accumulator 210 may also include one or more sensors 230, 232, 234 and a controller 240 such that the bale accumulator 210 may automatically rotate and unload the bales in a desired in-field orientation and grouped configuration, depending upon one or more parameters. The bale accumulator 210 may be manually controlled by the operator and/or automatically controlled via the controller 240 in order to achieve a desired in-field orientation and grouped configuration of the bales.

The frame 212 may be integrated into the main frame 202 of the round baler 200. Alternatively, the frame 212 may be a standalone frame which is removably connected to the main frame 202. The frame 212 may not include a designated support axle and wheels such that the bale accumulator 210 and the round baler 200 are supported by common axles. However, as shown, the frame 212 may include its own support axle and wheels 213. In either configuration, the frame 212 is located behind the main frame 202 and bale chamber 204. The entire frame 212 may also pivot relative to the main frame 202 of the round baler 200. Accordingly, the bale accumulator may include a frame actuator for pivoting the frame 212 downwardly in order to unload the bales.

Each bale holder 214, 216, 218 is pivotally and rotatably connected to the frame 212. Hence, each bale holder 214, 216, 218 is configured for rolling the bales by pivoting relative to the frame 212 and realigning the bales by rotating relative to the frame 212. The middle bale holder 216 may be located rearwardly of and adjacent to the bale chamber 204. The left and right bale holders 214, 216 may be respectively located adjacent to each lateral side of the middle bale holder 216. The bale holders 214, 216, 218 may be configured as plateaus or platforms for supporting the bales. Each bale holder 214, 216, 218 may be contoured for accommodating a curvature of each bale. For instance, each bale holder 214, 216, 218 may have a curved body with a semicircular cross-section. However, each bale holder 214, 216, 218 may comprise any desired shape, for example, a substantially flat body. Furthermore, each bale holder 214, 216, 218 may comprise any desired material, such as metal and/or plastic.

Each motor 220 may be respectively connected in between the frame 212 and the bale holders 214, 216, 218. More particularly, each motor 220 may rotate a beam or arm which is connected to the underside of each bale holder 214, 216, 218. Each motor 220 may independently rotate each bale holder 214, 216, 218. Thus, the bale holders 214, 216, 218 may rotate, by way of the motors 220, relative to the frame about a respective vertical axis to alter the axial orientation of the bales. Each motor 220 may rotate each bale holder 214, 216, 218 a full 360 degrees. Alternatively, each motor 220 may only rotate each bale holder 214, 216, 218 up to 90 degrees in between a first position and a second position. The motors 220 may be in the form of any desired hydraulic and/or electric motors.

The actuators 222 are connected in between the frame 212 and the bale holders 214, 216, 218. One or more actuators 222 may be coupled to each bale holder 214, 216, 218 for pivoting or tilting a respective bale holder 214, 216, 218. Hence, the bales holders 214, 216, 218 may tilt relative to the frame 212, by way of the actuators 222, about a respective horizontal axis to roll the bales in between the bale holders 214, 216, 218. In this regard, the bales are not pushed sideways, which may damage the bales and/or wrapping therearound; instead, the bales are gently rolled from one bale holder 214, 216, 218 to another. The actuators 222 may be in the form of any desired hydraulic and/or electric cylinders. It should be appreciated that FIGS. 2-7 are for illustrative purposes only and any distance(s) shown between the bale holders 214, 216, 218 and the frame 212 due to the extension and/or retraction of the actuators 222 is for illustrative purposes only and is thereby nonlimiting.

The one or more sensors 230, 232, 234 may be coupled to the round baler 200 and/or bale accumulator 210. The one or more sensors 230, 232, 234 may include at least one position sensor 230, an inclinometer sensor 232, and a global positioning system (GPS) sensor 234. For example, each bale holder 214, 216, 218 may have a respective position sensor 230 operably coupled thereto for sensing a position of each bale holder 214, 216, 218. Each position sensor 230 may be in the form of an optical sensor. The one or more inclinometer sensors 232 may be connected to the agricultural baler 200 or the frame 212 of the bale accumulator 210. As can be appreciated, the inclinometer sensor 232 may be configured for measuring the slope of the field. The GPS sensor 234 may be connected to and sense the location of the agricultural baler 200 or the bale accumulator 210. It should be appreciated that the bale accumulator 210 may include any desired type and number of sensors.

The controller 240 may be operably connected to the motors 220, actuators 222, and one or more sensors 230, 232, 234. The controller 240 may be in the form of any desired electrical processing circuit with a memory 242. The controller 240 is configured for automatically controlling the motors 220 and actuators 222 in response to one or more sensed and/or stored parameters. Furthermore, the controller 240 may control the motors 220 and actuators 222 based upon an inputted user command via a user interface. The controller 240 may calculate an optimum angle of ejection and/or grouped configuration for the grouped bales, or for each bale individually, based upon the slope of the field sensed by the inclinometer sensor 232, location of the round baler 200 within the field sensed by the GPS sensor 234, and/or any preprogramed parameter(s) stored within the memory 240, such as 3D field data. The controller 240 may be a standalone controller or integrated into existing software and/or hardware of the agricultural baler 200 and/or the bale accumulator 210.

Figure 3:
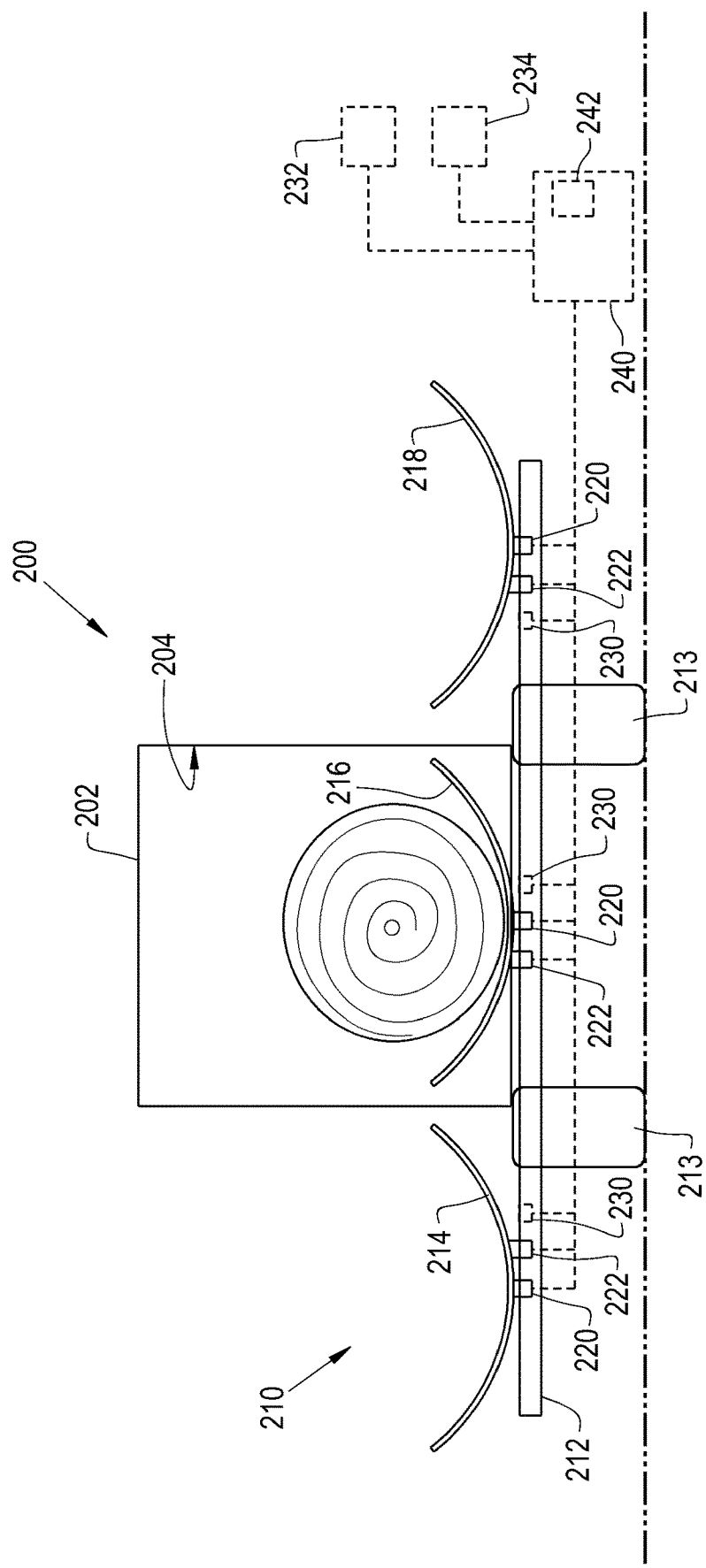
FIG. 3 illustrates a rear view of the bale accumulator of FIG. 2, wherein the middle bale holder is in a rotated position.
Figure 4:
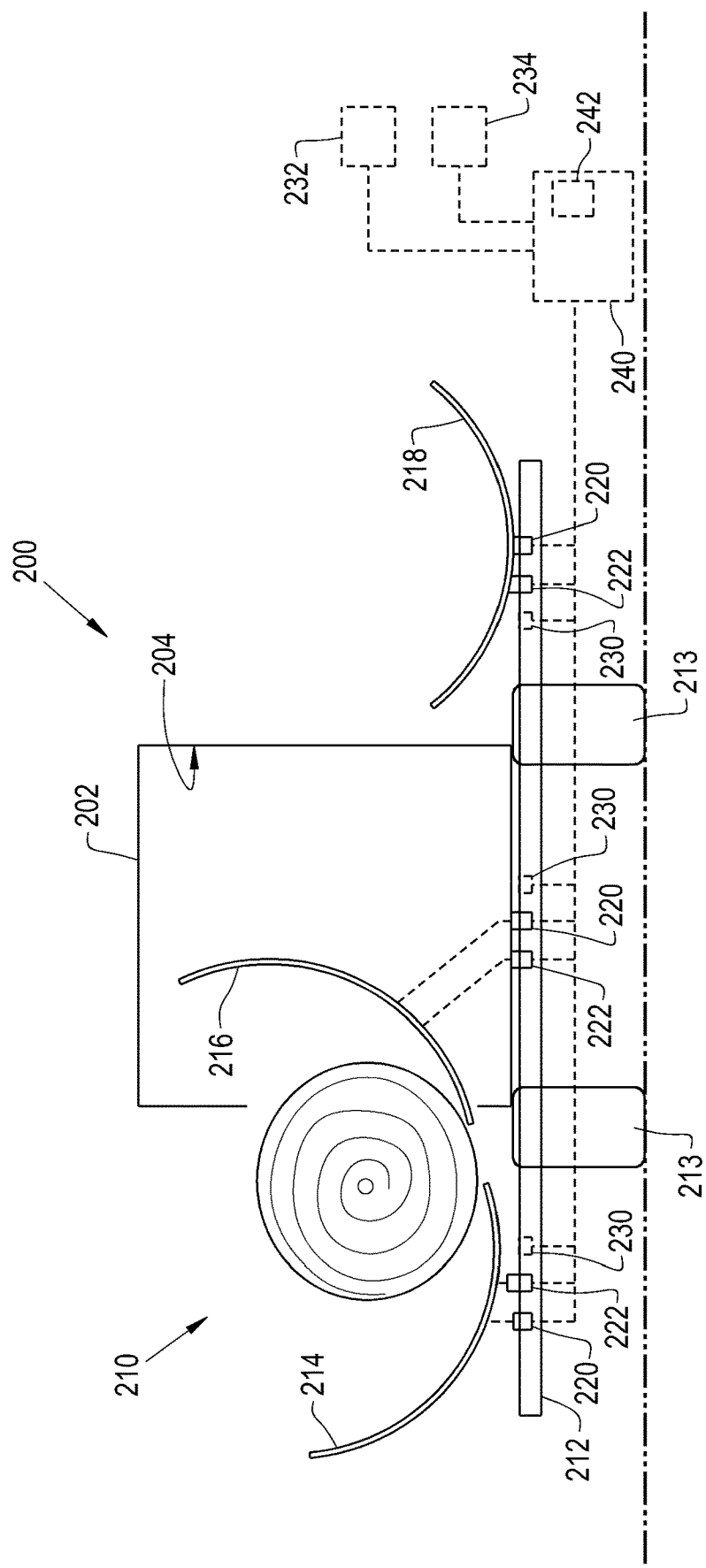
FIG. 4 illustrates a rear view of the bale accumulator of FIGS. 2-3, wherein the middle bale holder is in a transition position for rolling the bale onto the left bale holder.
Figure 5:
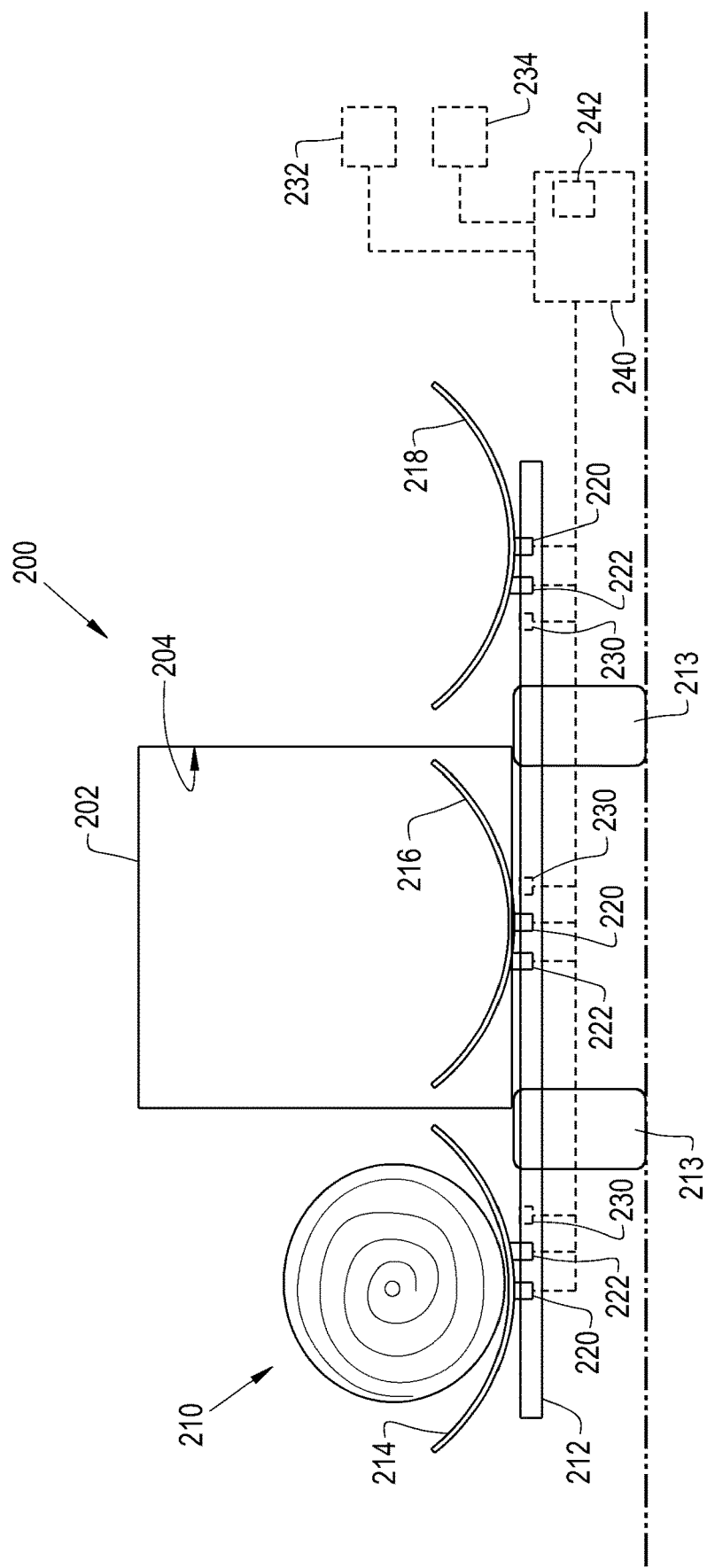
FIG. 5 illustrates a rear view of the bale accumulator of FIGS. 2-4, wherein the left bale holder has received the bale and is in the rotated position.
Figure 6:
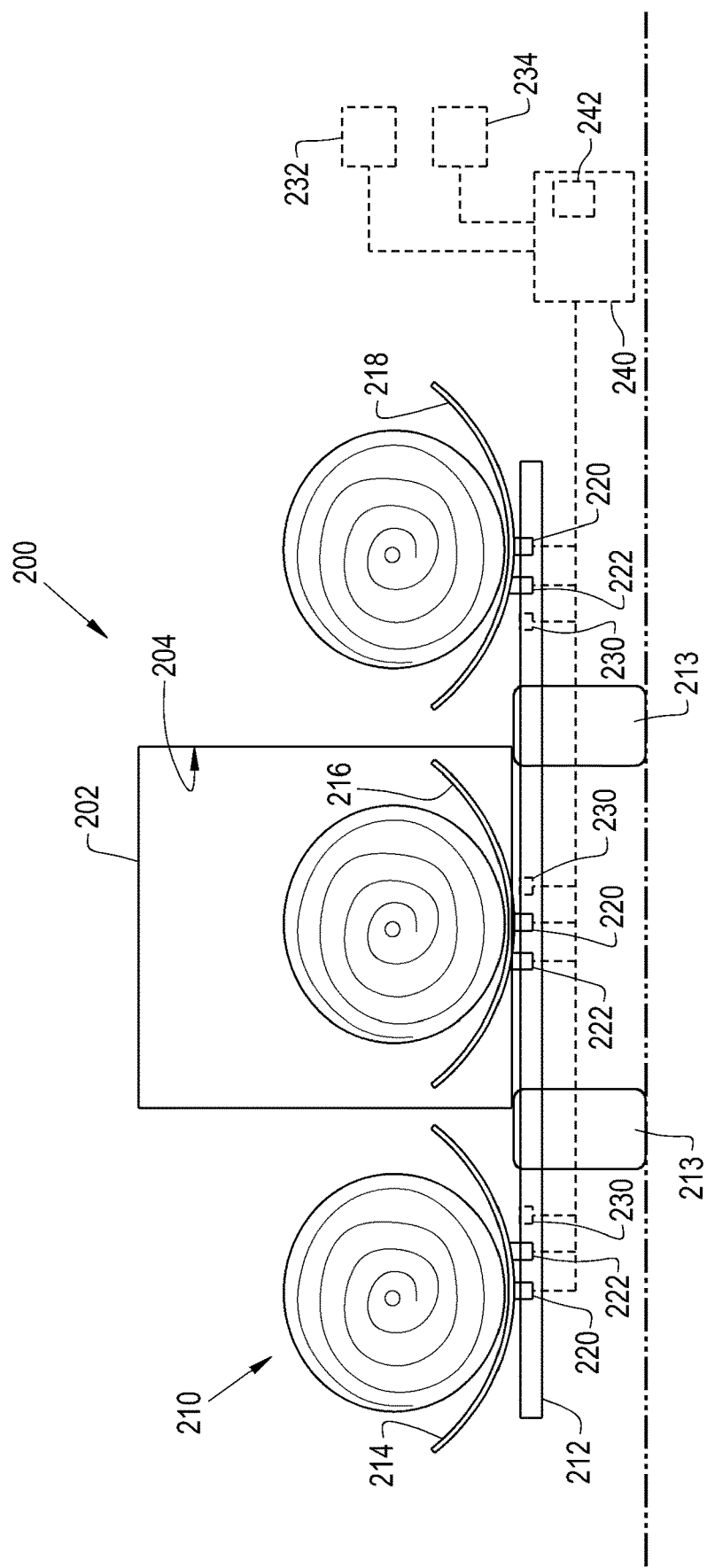
FIG. 6 illustrates a rear view of the bale accumulator of FIGS. 2-5, wherein the bale accumulator is in a fully loaded position with each bale holder having a respective bale.
Figure 7:
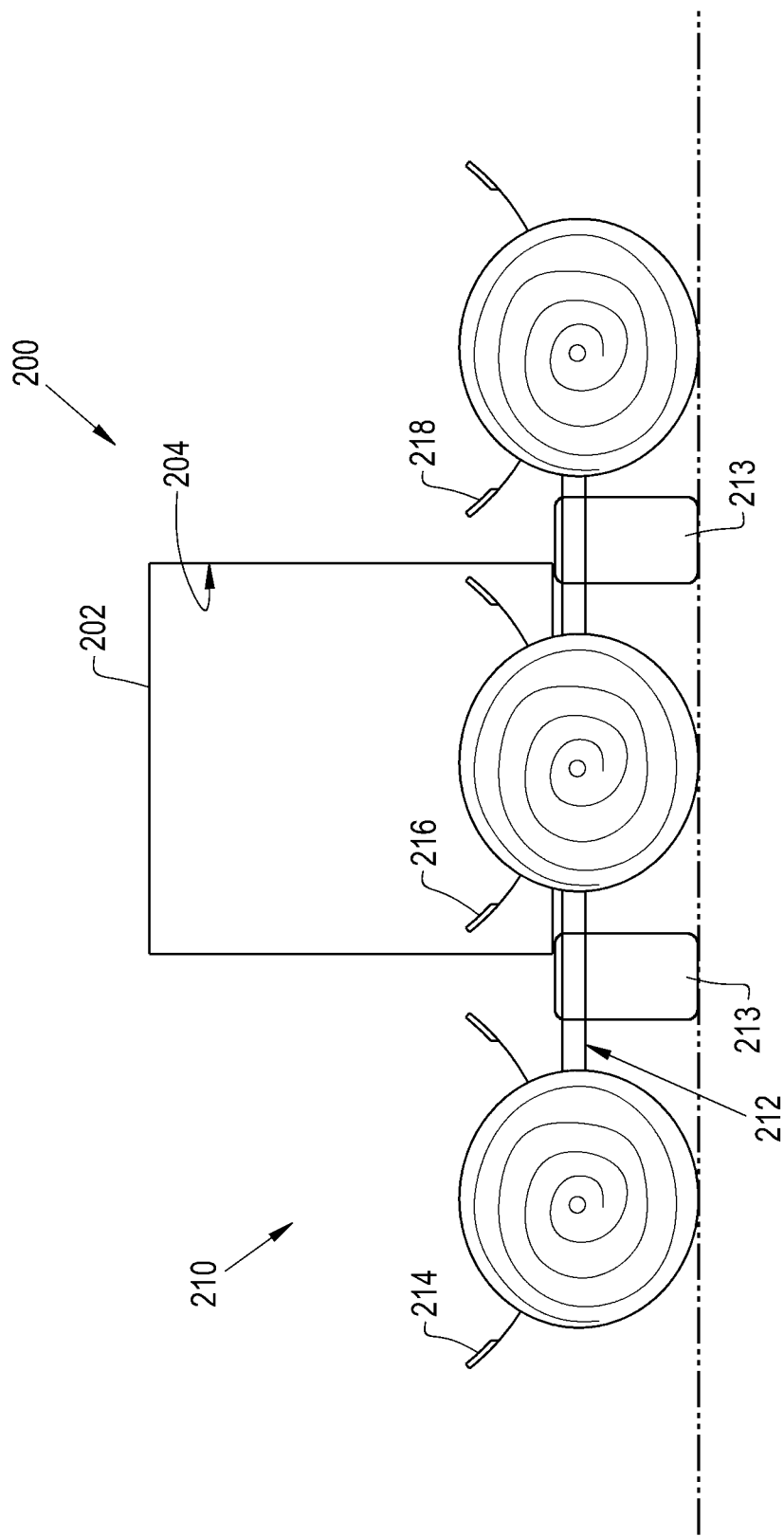
FIG. 7 illustrates a rear view of the bale accumulator of FIGS. 2-6, wherein the bale accumulator is an unloading position for unloading the bales onto the field.

In an operational method for the round baler 200, the middle bale holder 216 may at first be rotated into a receiving position (FIG. 2), and the completed bale exiting the bale chamber 204 may be subsequently ejected directly onto the middle bale holder 216. In this regard, the middle bale holder 216 initially receives the bale in its original formation alignment within the bale chamber 204, i.e., substantially perpendicular to the direction of travel. The middle bale holder 216 may or may not be tilted toward the bale chamber 204 in order to receive the incoming bale. Then, after receiving the bale, the middle bale holder 216 may be rotated approximately 90 degrees, plus or minus 20 degrees, into a transition position, i.e. substantially parallel to the direction of the travel (FIG. 3). The middle bale holder 216 may then pass or roll the bale laterally onto the left or right bale holder 214, 218. For example, as shown in FIG. 4, the actuators 222 may tilt the left and middle bale holders 214, 216 such that the force of gravity causes the bale to roll from the tilted middle bale holder 216 onto the correspondingly tilted left bale holder 214. It is noted that the receiving bale holder 214, 218 may not need to be tilted in order to receive the incoming bale. The middle bale holder 216 may subsequently repeat this process to fill another bale on the other bale holder 214, 218 which did not receive the first bale of the sequence. Once the left and right bale holders 214, 218 have been filled by a first bale and a second bale, respectively, the middle bale holder 216 may rotate again, receive another third bale, and subsequently rotate another time to realign the bale (FIG. 6). It should be appreciated that the bale accumulator 210 may temporarily hold the bales for any desired amount of time or until a desired location is reached. Before unloading the bales, the bale accumulator 210 may rotate the bales, automatically or upon receiving a manually inputted command, into any desired orientation. Then, the bale accumulator 210 may unload the bales onto the field in any desired grouped configuration by pivoting the bale holders 214, 216, 218 via their respective actuators 222 or by pivoting the entire frame 212 (FIG. 7).

Figure 8:
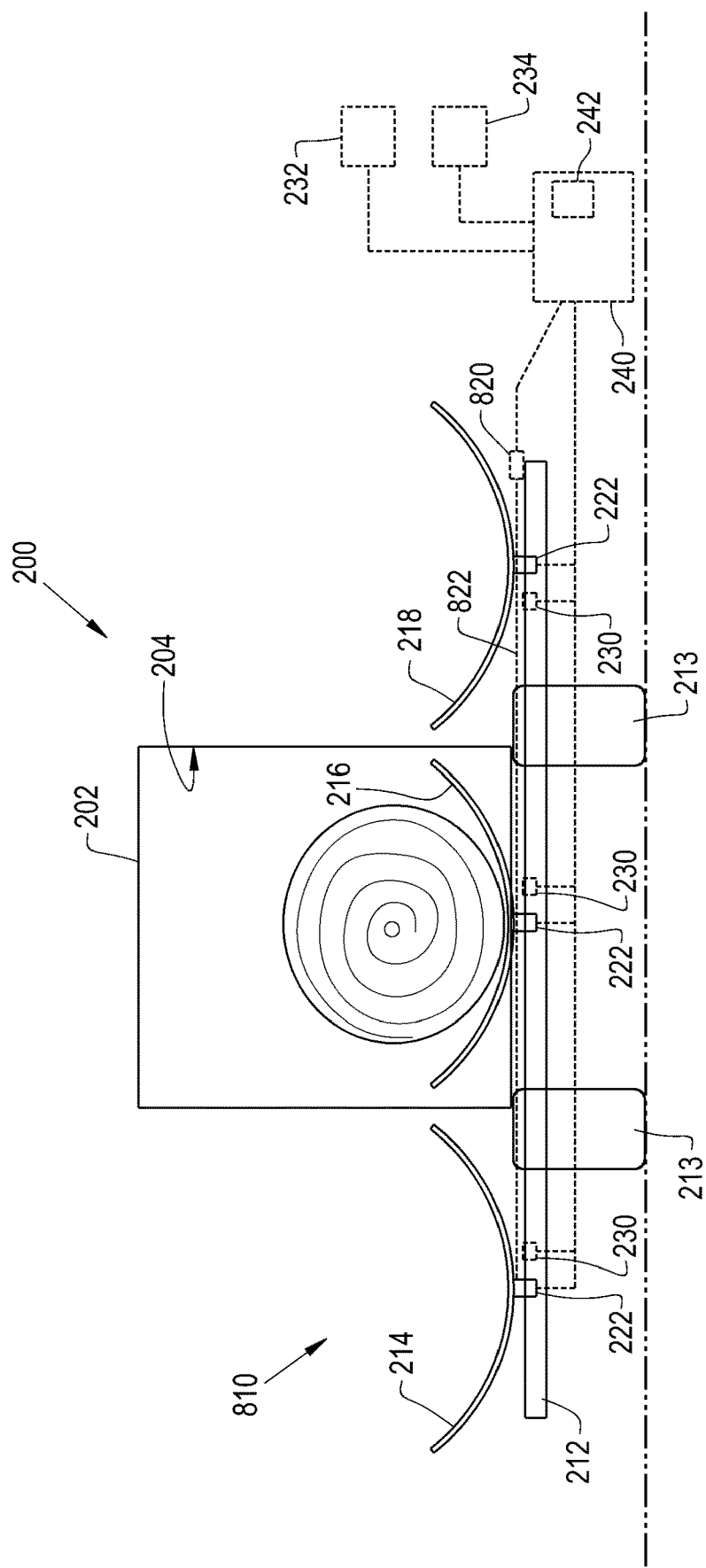
FIG. 8 illustrates a rear view of another bale accumulator that rotates the bale holders in tandem, in accordance with an exemplary embodiment of the present invention.

Referring now to FIG. 8, there is shown another embodiment of a bale accumulator 810. The bale accumulator 810 may be substantially similar to the bale accumulator 210, except that the bale accumulator 810 has a single motor 820 for rotating the bale holders 214, 216, 218 in tandem. The motor 820 is operably coupled to a mounting member, e.g. arm, of each bale holder 214, 216, 218 by a conveying member 822. The conveying member 822 may be in the form of an endless chain 822. Hence, the bale holders 214, 216, 218 rotate in tandem to receive the bales, roll the bales in between the bale holders 214, 216, 218, and/or axially realign the bales in a particularly in-field orientation for subsequent unloading. Like elements between the bale accumulators 210, 810 have been identified with like reference characters.

Figure 9:
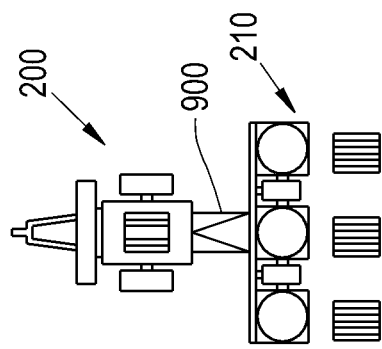
FIG. 9 is a top view of the bale accumulator of FIG. 2 or FIG. 8 illustrating a perpendicular ribbon configuration of unloaded bales.
Figure 10:
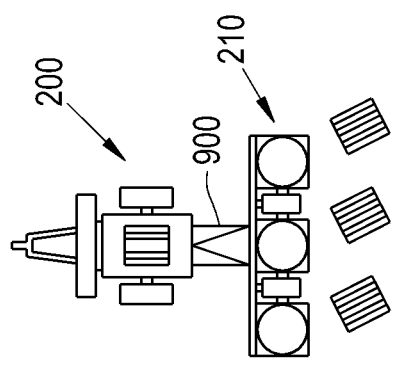
FIG. 10 is a top view of the bale accumulator of FIG. 2 or FIG. 8 illustrating an optimum, angled configuration of unloaded bales.
Figure 11:
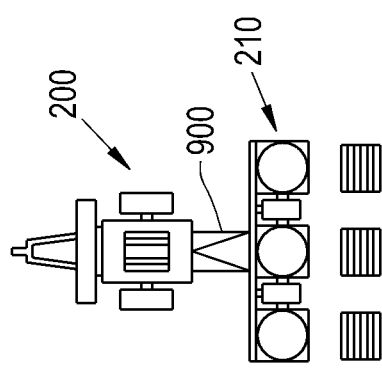
FIG. 11 is a top view of the bale accumulator of FIG. 2 or FIG. 8 illustrating a perpendicular side-by-side configuration of unloaded bales.
Figure 12:
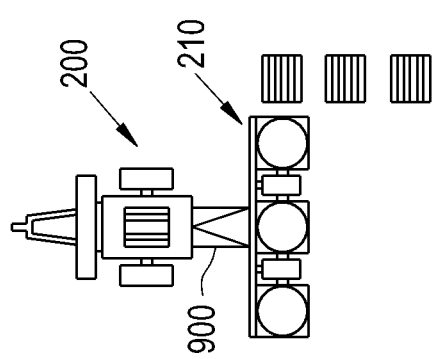
FIG. 12 is a top view of the bale accumulator of FIG. 2 or FIG. 8 illustrating an inline lateral configuration of unloaded bales.

Referring now specifically to FIGS. 9-12, there is shown possible in-field orientations and grouped configurations for the unloaded bales. Either bale accumulator 210, 810 may unload the bales in the in-field orientations and grouped configurations, as shown in FIGS. 9-12. Yet, by way of example only, the unloading procedures of FIGS. 9-12 are discussed in reference to the bale accumulator 210 only. In one unloading procedure, the bale accumulator 210 may unload the bales in a perpendicular ribbon configuration, wherein the bales are axially perpendicular to the forward direction of travel (FIG. 9). The bale accumulator 210 may unload the bales in an optimum, angled configuration, wherein the axial orientation of the bales is not perpendicular or parallel with the forward direction of travel (FIG. 10). In the angled configuration, the bale accumulator 210 may align the bales to specifically accommodate the slope of the field such that the bales do not move upon being unloaded due to the slope of the field. Additionally, for example, the bale accumulator 210 may unload the bales in a perpendicular side-by-side configuration, wherein the bales are perpendicular to the forward direction of travel (FIG. 11). Also, the bale accumulator 210 may unload the bales in an inline lateral configuration, wherein the bales are axially inline with one another and are perpendicular to the forward direction of travel (FIG. 12). In the inline lateral configuration, the bale accumulator 210 unloads the bales one-by-one by passing or rolling the bales laterally to one side of the round baler 200 via the bale holders 214, 216, 218. For instance, the right bale holder 218 may tilt to unload its bale. Then, the round baler 200 may be forwardly driven, and the middle bale holder 216 may roll its bale onto the right bale holder 218, which then subsequently unloads the bale onto the field. Finally, the round baler 200 may be forwardly driven again, and the left bale holder 214 may rolls its bale onto the middle bale holder 216, which rolls the bale onto the right bale holder 218 for subsequent unloading onto the field. Thus, the bales are laterally inline with one another. It should be appreciated that the bale accumulator 210 may deposit the bales in any desired orientation and grouped configuration.

In accordance with another aspect of the exemplary embodiments of the bale accumulators 210, 810, each bale accumulator 210, 810 may include an optional transition member 900 located in between the bale chamber 204 and the middle bale holder 216 (FIGS. 9-12). The transition member 900 may be in the form of a deformable canvas, such as a tarp, or a conveyor, such as a belt conveyor. It should be appreciated that the bale accumulators 210, 810 may not include a transition member 900 such that the bales roll directly onto the middle bale holder 216 upon exiting the bale chamber 204.

It is to be understood that the operational modes of the round baler 200 may be performed by the controller 240 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 240 described herein is implemented in software code or instructions which are tangibly stored on a tangible computer readable medium. The controller 240 loads the software code or instructions via a direct interface with the computer readable medium or via a wired and/or wireless network. Upon loading and executing such software code or instructions by the controller 240, the controller 240 may perform any of the functionality of the bale accumulators 210, 810 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. A bale accumulator for a round baler comprising a bale chamber for forming bales of crop material, the bale accumulator comprising:
    a frame configured for being located behind the bale chamber; and
    a plurality of bale holders configured for receiving and temporarily holding the bales, and each bale holder is pivotally and rotatably connected to the frame such that each bale holder is configured for rolling the bales from one bale holder to an adjacent bale holder by pivoting relative to the frame and realigning the bales by rotating relative to the frame.

2. The bale accumulator of claim 1, wherein the plurality of bale holders comprise a first bale holder configured for being located rearwardly of the bale chamber and a second bale holder located adjacent to the first bale holder, and the first bale holder is configured for receiving a first bale from the bale chamber and rotating to realign the first bale, and the second bale holder is configured for receiving the first bale from the first bale holder and rotating to realign the first bale.

3. The bale accumulator of claim 2, wherein the plurality of bale holders comprise a third bale holder located adjacent to the first bale holder, the first bale holder is configured for receiving a second bale from the bale chamber and rotating to realign the second bale, and the third bale holder is configured for receiving the second bale from the first bale holder and rotating to realign the second bale.

4. The bale accumulator of claim 1, wherein each bale holder is in the form of a plateau.

5. The bale accumulator of claim 4, wherein each plateau comprises a curved body for accommodating a curvature of each bale.

6. The bale accumulator of claim 1, further comprising at least one motor connected to the frame and operably connected to each bale holder, and the at least one motor is configured for rotating for each bale holder.

7. The bale accumulator of claim 6, further comprising a plurality of the actuators connected to the frame and operably connected to the plurality of bale holders, and each actuator is configured for pivoting a respective bale holder.

8. The bale accumulator of claim 7, further comprising a plurality of position sensors, being associated with the plurality of bale holders, and a controller operably connected to the at least one motor, the plurality of the actuators, and the plurality of sensors, and the controller is configured for automatically aligning and unloading the bales in an in-field orientation and a grouped configuration depending upon at least one of a sensed parameter and a stored parameter.

9. The bale accumulator of claim 1, wherein the plurality of bale holders is configured for unloading bales in at least one of an inline lateral configuration, a side-by-side configuration, an angled configuration, and a perpendicular ribbon configuration.

10. A round baler, comprising:
a bale chamber for forming bales of crop material; and
a bale accumulator comprising a frame located behind the bale chamber and a plurality of bale holders configured for receiving and temporarily holding the bales, and each bale holder is pivotally and rotatably connected to the frame such that each bale holder is configured for rolling the bales from one bale holder to an adjacent bale holder by pivoting relative to the frame and realigning the bales by rotating relative to the frame.

11. The round baler of claim 10, wherein the plurality of bale holders comprise a first bale holder located rearwardly of the bale chamber and a second bale holder located adjacent to the first bale holder, and the first bale holder is configured for receiving a first bale from the bale chamber and rotating to realign the first bale, and the second bale holder is configured for receiving the first bale from the first bale holder and rotating to realign the first bale.

12. The round baler of claim 11, wherein the plurality of bale holders comprise a third bale holder located adjacent to the first bale holder, the first bale holder is configured for receiving a second bale from the bale chamber and rotating to realign the second bale, and the third bale holder is configured for receiving the second bale from the first bale holder and rotating to realign the second bale.

13. The round baler of claim 10, wherein each bale holder is in the form of a plateau.

14. The round baler of claim 13, wherein each plateau comprises a curved body for accommodating a curvature of each bale.

15. The round baler of claim 10, wherein the bale accumulator further comprises at least one motor connected to the frame and operably connected to each bale holder, and the at least one motor is configured for rotating for each bale holder.

16. The round baler of claim 15, wherein the bale accumulator further comprises a plurality of the actuators connected to the frame and operably connected to the plurality of bale holders, and each actuator is configured for pivoting a respective bale holder.

17. The round baler of claim 16, further comprising a plurality of position sensors, being associated with the plurality of bale holders, and a controller operably connected to the at least one motor, the plurality of the actuators, and the plurality of sensors, and the controller is configured for automatically aligning and unloading the bales in an in-field orientation and a grouped configuration depending upon at least one of a sensed parameter and a stored parameter.

18. The round baler of claim 10, wherein the plurality of bale holders is configured for unloading bales in at least one of an inline lateral configuration, a side-by-side configuration, an angled configuration, and a perpendicular ribbon configuration.

19. A method for operating a round baler, comprising:
providing a bale accumulator, for the round baler, comprising a frame configured for being located behind a bale chamber of the round baler, and a plurality of bale holders configured for receiving and temporarily holding bales, and each bale holder is pivotally and rotatably connected to the frame;
receiving the bales by the plurality of bale holders;
temporarily holding the bales by the plurality of bale holders;
realigning the bales by rotating the plurality of the bale holders relative to the frame and pivoting the bale holders to roll the bales to an adjacent bale holder; and
unloading the bales onto a field by pivoting the plurality of bale holders.

20. The method of claim 19, wherein the plurality of bale holders comprising a first bale holder configured for being located rearwardly of the bale chamber, a second bale holder located adjacent to the first bale holder, and a third bale holder located adjacent to the first bale holder, and the method further comprising rolling a first bale, by the first bale holder, onto the second bale holder and rolling a second bale, by the first bale holder, onto the third bale holder.

* * * * *